Patented Oct. 27, 1936

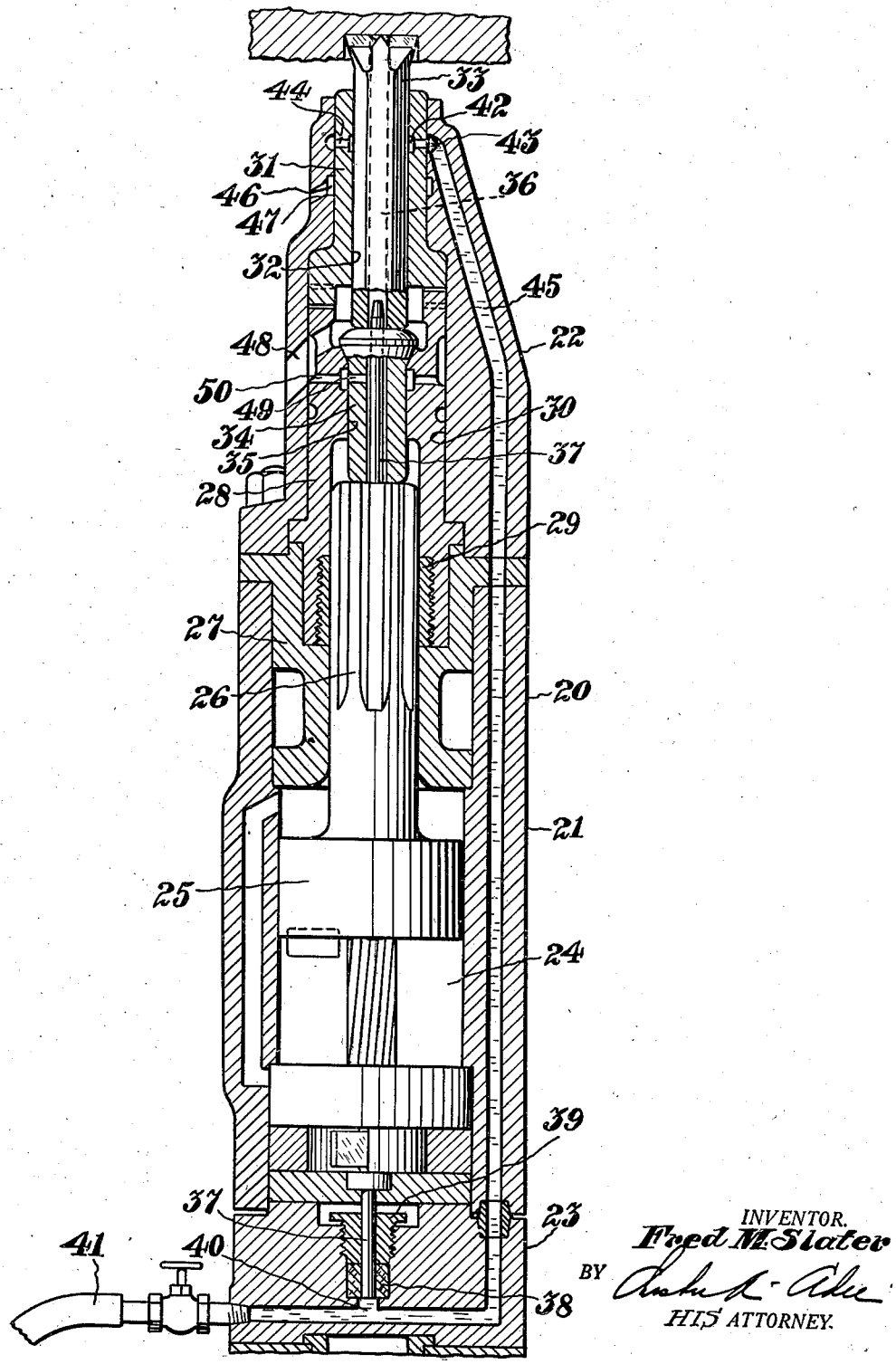

2,059,048

UNITED STATES PATENT OFFICE 2,059,048

ROCK DRILL

Fred M. Slater, Easton, Pa., assignor to Ingersoll-Rand Company, Jersey City, N. J., a corporation of New Jersey Application May 2, 1934, Serial No. 723,426

3 Claims. (Cl. 121—10)

This invention relates to rock drills, and more particularly to a front end construction for rock drills of the stoper type.

One object of the invention is to prevent cleansing water and entrained solids, flowing from the drill hole, from entering the front end of the rock drill.

Other objects will be in part obvious and in part pointed out hereinafter.

The figure in the accompanying drawing is a sectional elevation of the percussive element of a rock drill constructed in accordance with the practice of the invention.

Referring more particularly to the drawing, 20 designates a rock drill comprising a cylinder 21, a front head 22 and a back head 23 which constitute the casing parts of the rock drill.

Within the cylinder 21 is a piston chamber 24 to accommodate a reciprocatory hammer piston 25 having an extension 26 which extends slidably through a front cylinder washer 27 in the front end of the cylinder 21.

The front end of the front cylinder washer 27 serves as a guide for a chuck 28 containing a chuck nut 29, wherewith the stem 26 may be slidably interlocked in a well known manner and, the front portion of the chuck 28 extends into a bore 30 in the front head 22 and is clutched to a chuck jaw 31 disposed in the front end of the front head 22. The chuck jaw 31 has a bore 32 to receive and interlockingly engage the shank of a drill steel 33 to which the blows of the hammer piston 25 are transmitted by an anvil block 34 arranged in a bore 35 in the chuck 28.

In the drill steel 33 is a passage 36 to convey cleansing liquid to the drill hole for removing the cuttings and the hammer piston 25 and the anvil block 34 are bored to accommodate a water tube 37 which conveys water to the passage 36. The water tube is secured, as by means of a packing member 38 and a gland 39, in the back head 23. The rear end of the water tube is preferably in direct communication with the passage 40 in the back head and into which water is constantly delivered by a conduit 41 connected to the back head.

Rock drills of the type to which the present invention relates are used principally for drilling holes above the horizontal. Therefore, during their operation, the water directed into the drill hole for cleansing it runs downwardly along the working implement and, unless suitable precautions are taken, enters the front end of the rock drill carrying thereinto cuttings which, by their abrasive action, cause excessive wear on the casing and the parts encased thereby. This is particularly true after some usage when the original clearances become considerably increased.

It is accordingly contemplated to so construct the front end of the drill as to enable the introduction of fluid, as for instance water, between the cooperating surfaces of the various elements constituting the front end of the rock drill. To this end an annular groove 42 is formed in the bore 32, preferably near its front end, to encircle the working implement, and the groove 42 is connected with an annular groove 43 in the bore 30 and near its front end by a passage or passages 44 in the chuck jaw 31. The annular groove 43 is in turn connected with the passage 40, in the back head 23, by a branch passage 45 extending through the cylinder 21 and the front head 22.

Preferably the portions of the bores 30 and 32 lying forwardly of the grooves 42 and 43 are enlarged slightly so that greater clearances exist between their walls and the portions of the elements adjacent thereto than exist rearwardly of the grooves 42 and 43. Owing to this arrangement, when liquid is introduced into the grooves 42 and 43 it will tend to flow toward the front extremity of the drill rather than rearwardly toward the percussive element. Suitable provisions may, however, be made to intercept and convey any water that may flow rearwardly along the bore 30. The means illustrated consist of an annular groove 46 in the bore 30, rearwardly of the groove 43, and said groove 46 communicates with the atmosphere through a port 47 in the front head 22.

Similarly, any water which may flow rearwardly along the shank of the drill steel 33, into the bore 35 containing the anvil block, will find an exit to the atmosphere through a passage 48 in the chuck 28 and the front head 22.

In order to prevent the passage of portions of the motivating fluid into the drill hole through the anvil block and the passage 36 in the drill steel the bore in the anvil block, through which the tube 37 extends, is vented to the atmosphere through registering passages 49 and 50 in the anvil block and the chuck 28, respectively. The passage 50 may, as illustrated, open into the passage 48.

The operation of the device is as follows: Upon the introduction of water to the drill hole to flush the cuttings therefrom water also flows through the passage 45 into the grooves 42 and 43 to create a liquid seal around the chuck jaw and the working implement. A portion of the liquid in these grooves flows forwardly through the clearances provided for this purpose and prevents the entrance of flushing water and entrained solids into the front end of the rock drill.

Any slight amounts of water that may flow rearwardly along the bores 30 and 32 will readily escape to the exterior of the rock drill through the passages 47 and 48. Similarly, such pressure fluid as may enter the anvil block 34 passes through the passages 49, 50 and 48 to the atmosphere instead of flowing through the drill steel into the drill hole.

I claim:

1. In a rock drill, the combination of a casing having a bore and a working implement in the bore, a groove in the bore intermediate the ends of the bore and encircling the working implement, the portion of the bore forwardly of the groove being of slightly larger diameter than the portion of the bore lying rearwardly of the groove, and a passage in the casing conveying fluid to the groove to prevent the entrance of cuttings into the bore.

2. In a rock drill, the combination of a casing having a bore and a guide member in the bore having a bore, a working implement in the guide member, annular grooves in the bores and being located near and rearwardly of the front ends of each, the portions of the bores forwardly of the grooves being of slightly larger diameter than the portions of the bores lying rearwardly of the grooves, and a passage in the casing conveying fluid to the grooves to prevent the entrance of cuttings into the bore and the guide member.

3. In a rock drill, the combination of a casing having a bore and a guide member in the bore having a bore, a hollow working implement in the guide member, a tube in the casing for conveying cleansing fluid to the working implement, means for constantly supplying cleansing fluid to the tube, annular grooves in the bores and being located near and rearwardly of the front ends of each, the portions of the bores forwardly of the grooves being of slightly larger diameter than the portions of the bores lying rearwardly of the grooves, and a passage in the casing conveying fluid from the said means to the grooves to prevent the entrance of cuttings into the bore and the guide member.

FRED M. SLATER.